United States Patent [19]

Zdaniewski et al.

[11] 4,365,407
[45] Dec. 28, 1982

[54] METHOD OF MAKING AN INSULATED POLE AND COIL ASSEMBLY

[75] Inventors: Joseph J. Zdaniewski; William B. Penn; Roy L. Balke, all of Erie, Pa.

[73] Assignee: General Electric Company, Schenectady, N.Y.

[21] Appl. No.: 230,471

[22] Filed: Feb. 2, 1981

Related U.S. Application Data

[63] Continuation of Ser. No. 41,170, May 21, 1979, Pat. No. 4,293,784.

[51] Int. Cl.$^3$ ............................................. H02K 15/10
[52] U.S. Cl. ........................................ 29/598; 29/606; 310/45
[58] Field of Search ..................... 29/596, 598, 606; 310/45, 269, 216–218, 179, 180

[56] References Cited

U.S. PATENT DOCUMENTS

| 830,419 | 9/1906 | Downes | 310/179 X |
| 2,744,204 | 5/1956 | McGuiness | 310/218 |
| 3,182,383 | 5/1965 | Rosenberg et al. | 310/45 X |
| 3,339,097 | 8/1967 | Dunn | 310/269 X |
| 3,359,631 | 12/1967 | Larsen et al. | 29/606 |

*Primary Examiner*—Carl E. Hall
*Attorney, Agent, or Firm*—Vale P. Myles

[57] ABSTRACT

A dynamoelectric machine pole and coil assembly having a magnetic pole member around which a preformed coil of insulated magnet wire is mounted. The assembly is characterized by including a plurality of preformed, extended corner sheets of insulating material that are positioned to extend around and beyond each of the corners of the magnetic pole member into overlapping relationship with adjacent extended corner sheets. The extended corner sheets are bonded to the pole member and to one another at their overlapped ends. Projecting tip portions on the magnetic pole member have their upper surfaces completely shielded from the energizing coil by lip parts of the extended corner insulating sheets. A felt piece impregnated with thermosetting resin is used to make a readily conformable corner section of the lip part. A castable dielectric material forms a rigid body between the sheets of insulating material and the energizing coil to provide good thermal conduction for dissipating heat from the coil to the pole member. One aspect of the invention is a method for making a pole assembly with preformed sheets of insulating material so that each such sheet is provided with a relatively uniform, smooth lip surface including a corner section for each lip part of the insulating sheets so that they can be smoothly adhered to the surface of the magnetic pole member to which they conform closely in surface configuration, thereby to avoid the formation of air spaces between it and the associated coil when those components are assembled in operating position.

4 Claims, 2 Drawing Figures

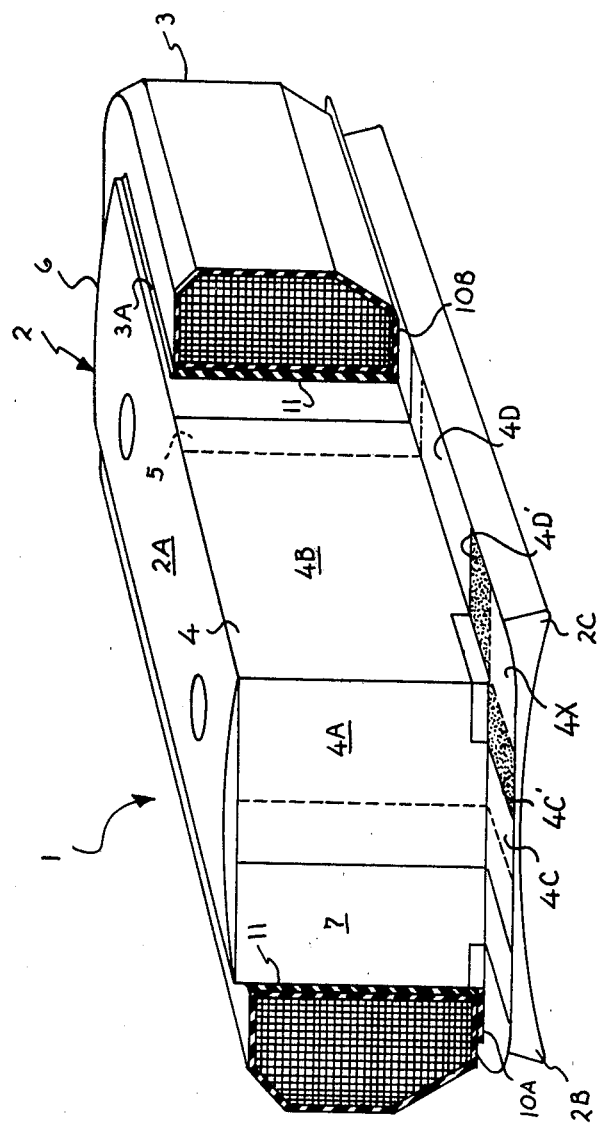

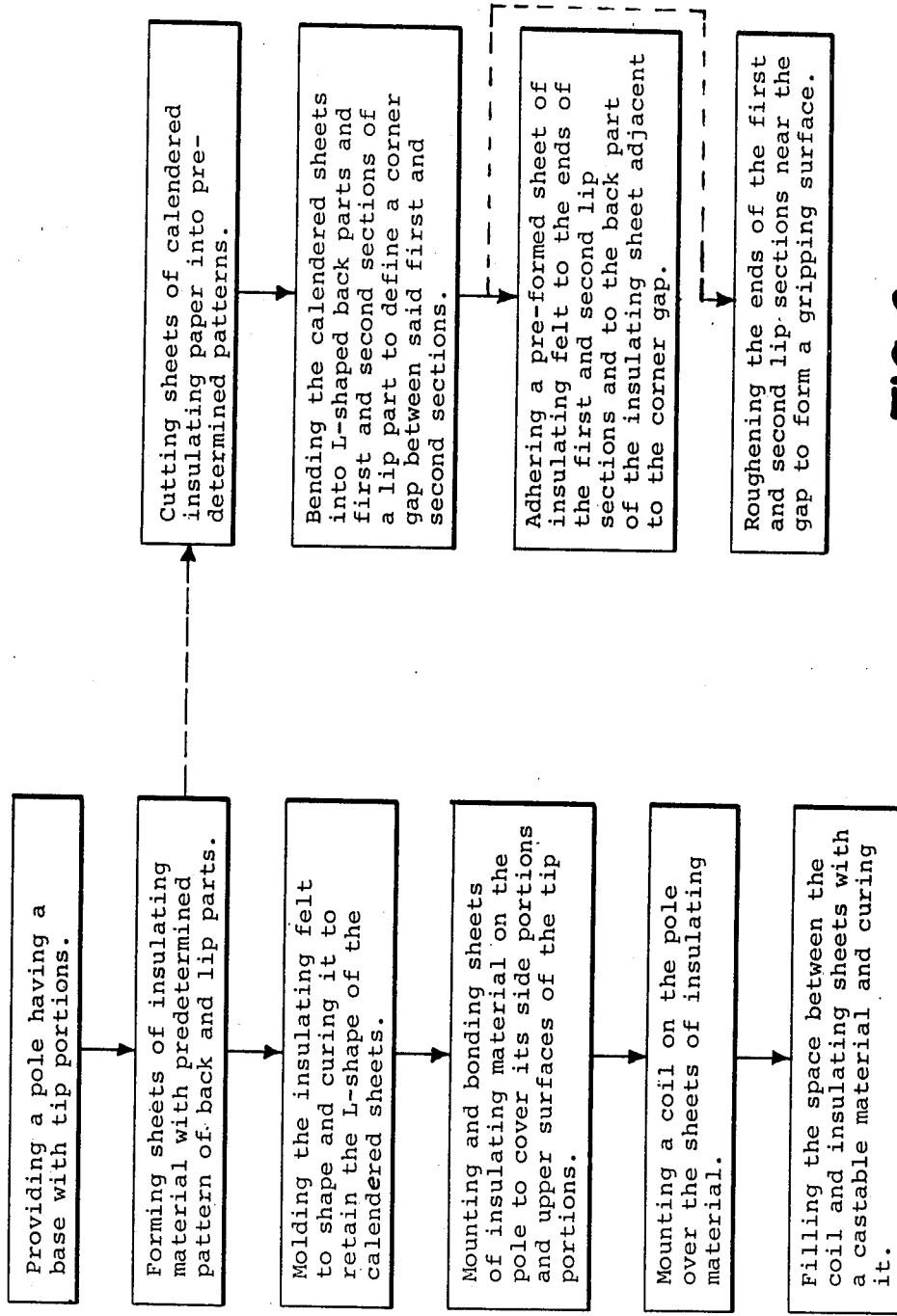

METHOD OF MAKING AN INSULATED POLE AND COIL ASSEMBLY

This is a continuation of application Ser. No. 41,170, filed May 21, 1979 issued as U.S. Pat. No. 4,293,784 on Oct. 6, 1981.

BACKGROUND OF THE INVENTION

This invention relates to a pole and coil assembly for a dynamoelectric machine and to a method for making such an assembly; more particularly, it relates to a salient pole assembly having an improved pole-to-coil ground barrier and method for making same.

A variety of different pole and coil assemblies are known and used for constructing dynamoelectric machine salient poles that are mechanically stable in operation and include ground insulation barriers between an energizing coil and a pole member of magnetic metal. In designing and building such salient pole and coil assemblies several objectives are commonly sought. For example, it is important to assure good structural support of the coil on the magnetic pole member and to provide effective ground insulation between the coil and the magnet metal of the pole assembly. While affording such objectives, a designer must also provide means for effectively dissipating heat that is generated in the coil during its operation. In that respect, it is common practice to attempt to improve thermal conduction between the coil and magnetic pole member thereby to enable the pole member to act as a heat sink for the coil.

In view of such common objectives, currently conventional salient pole and coil assemblies typically have been designed to incorporate dielectric ground barriers and thermal conduction systems between the coils and magnetic pole members in order to provide an optimum combination of the desired characteristics, given the limitations and requirements of the materials available to implement such designs. At the same time there exists a desire to further increase the rated outputs of dynamoelectric machines utilizing such salient pole assemblies. To achieve these desired increases, the field strength of the energizing coils in the pole assemblies must be increased. Such larger field currents impose greater insulating problems on the ground barriers of the systems and also create a need for improved thermal conduction from the coils to adequately dissipate the added heat generated.

A number of different pole and coil assembly structures have been developed in the past to solve the above-mentioned problems while seeking to afford the noted design objectives. For example, pole energizing coils have been wound with insulating tape and then tightly secured around a magnetic pole member by driving wedges between the two components of the assembly to tighten them and improve thermal conduction between them. That sort of relatively expensive and somewhat thermally inefficient system was followed by an improved pole and coil assembly construction in which a coil is wrapped with glass insulating tape then is potted in insulating resin on the pole, to form an electrically insulating shell around the entire assembly. Normally a vacuum impregnation process is needed when practicing such a construction method, in order to avoid the formation of air pockets in the impregnating resin, otherwise, the ground barrier might fail during operation of the assembly. Relatively recently, a system has been developed for mounting a form wound coil on a magnetic pole member then pouring casting compound between those two components to form a rigid structure and to improve thermal conduction between them. Such a method is described in U.S. Pat. No. 3,359,631, which issued on Dec. 26, 1967 and is assigned to the same assignee as is the invention disclosed herein.

It is also known in the prior art to utilize articulated sheets of insulating material mounted between a magnetic pole member and an associated energizing coil. For example, U.S. Pat. No. 830,419 which issued on Sept. 4, 1906 discloses a field coil insulation system that includes a number of formed sheets of impregnated asbestos mounted around an energizing field coil to protect the coil from deterioration due to normal exposure to weather and contaminants such as dirt and water. U.S. Pat. No. 765,189 which issued on July 19, 1904 discloses a transformer coil insulation system that includes a number of plaited corner pieces comprising folded sheets of insulating paper that are arranged to completely cover the corners of the coil and insulate them from an associated magnetic member. U.S. Pat. No. 2,744,204 which issued on May 1, 1956 and is assigned to the assignee of the present invention, discloses an electric coil and associated pole assembly in which spacers are mounted in corner recesses of a pole to complete a stress-relieved rectangular pole configuration so the coil positioned around the pole will form good thermal contact with essentially all of the encompassed pole surface. A coating of plastisol and non-hygroscopic glass mats is mounted around the pole before the energizing coil is positioned on it to hold the glass mats in intimate thermally conductive contact with the pole. Inherent drawbacks common to such prior art pole and coil assemblies are that they include creased or folded surfaces in the ground barrier insulating materials, particularly where these materials are stretched or folded to form corners in the barrier system. Also, those earlier systems typically required relatively thick layers of insulating mats between the coil and pole in an assembly. Such thick mats undesirably limit the dissipation of coil-generated heat in the pole heat sink.

OBJECTS OF THE INVENTION

A primary object of the invention is to provide a pole and coil assembly, and method for making it economically and reliably, to afford the foregoing design objectives while avoiding the above-noted drawbacks of related prior art assemblies.

Another object of the invention is to provide a salient pole and coil assembly that has an insulating ground barrier which is improved relative to related prior art assemblies in that it provides extended corner members that conform smoothly to the angular surfaces of the pole and afford a void-free dielectric barrier in the high electrical stress areas at the pole corners.

A further object of the invention is to provide a dynamoelectric machine pole and coil assembly that is readily producible and has a desirably compact appearance while providing excellent ground insulation between its energizing coil and magnetic pole member and at the same time assures good thermal conduction between those components of the assembly.

Yet another object of the invention is to provide a method for making a dynamoelectric machine salient pole and coil assembly in a simplified construction that is easily and reliably producible on a mass production basis and affords excellent ground insulation between the magnetic pole member and energizing coil while affording good thermal conduction between those components.

Additional objects and advantages of the invention will be apparent from the description of it that follows considered in conjunction with the accompanying drawings.

SUMMARY OF THE INVENTION

In one preferred embodiment of the invention a dynamoelectric machine pole and coil assembly is constructed by mounting a plurality of sheets of preformed insulating material on a magnetic pole member to substantially cover all of its corners and side surface areas, and to cover the coil-supporting surfaces of tip portions of the pole member. The respective sheets of insulating material are preformed to fit closely around the associated corners of the magnetic pole member and to extend beyond those corners into overlapping relationship with the ends of adjoining formed sheets of insulating material extending from adjacent corners of the magnetic pole member. An energizing coil having a formed opening therein is fitted snugly over the magnetic pole member and the sheets of insulating material mounted on it, then a thermally conductive material is cast between the coil and the outer surfaces of the sheets of insulating paper to form a rigid pole and coil assembly that possesses excellent heat dissipating properties and good ground insulation for the coil. One aspect of the invention is a preferred method for forming the pole and coil assembly in easily performable manufacturing steps that include cutting and molding sheets of insulating paper into desired extended-corner configurations, mounting those extended-corner sheets on the respective corners of a magnetic pole member, then positioning an energizing coil over the formed sheets of insulating paper and casting an insulating resin having excellent thermal conduction properties between the preformed extended corner sheets and the inner periphery of the energizing coil.

BRIEF DESCRIPTION OF THE DRAWING

FIG. 1 is a perspective view, partly in cross-section, of a dynamoelectric machine salient pole and coil assembly including a plurality of preformed dielectric ground barriers positioned between the magnetic pole and the energizing coil.

FIG. 2 is a chart showing preferred method steps for practicing the method of the invention.

DETAILED DESCRIPTION

In order to describe the invention, at the outset a preferred embodiment of a pole and coil assembly will be described with reference to FIG. 1, then a description will be given of a preferred method for fabricating such an assembly. Accordingly, it will be seen that there is shown in FIG. 1 an insulated pole and coil assembly 1 that is suitable for mounting as a salient pole in a dynamoelectric machine such as an electric motor or generator. The preferred embodiment of the assembly shown includes a pole member 2 that is formed of a plurality of conventional punched laminations made of a suitable magnetic material such as a grain-oriented steel of a type conventionally used to manufacture such assemblies for dynamoelectric machines. The laminations are flat, as shown, and are held in a tightly-compressed-together position by a plurality of rivets or other suitable retaining means, in any well-known manner. In this particular embodiment, the pole member has a base portion 2A and two projecting tip portions 2B and 2C that protrude respectively from opposite sides of the base portion to define leading and trailing edges of the pole. As is conventional, the tip portions and adjacent bottom surface of the pole base portion are curved slightly to conform to the radius of curvature of an associated rotor (not shown) that will be mounted in conventional cooperating relationship with the salient pole assembly (and other such assemblies) when it is assembled in operating position in a dynamoelectric machine. The upper surfaces of the pole tip portions 2B and 2C are disposed, respectively, at essentially 90° to the sidewalls of the pole base portion 2A in this form of the invention, but it will be recognized that other angular orientations of these surfaces may be used in alternative types of pole assemblies.

An energizing coil 3 that is formed of commercially available insulated magnet wire is mounted on the pole member 2, as shown in FIG. 1. To enable such mounting, the coil 3 has a central opening 3A formed in it in any suitable manner such that the coil opening fits closely around the pole base portion 2A, essentially as shown. Such laminated magnetic pole members and associated preformed energizing coils are commonly combined in the general manner shown (except for the ground barrier system and associated method described herein), so it is not believed that a further detailed description of the parts of the illustrated embodiment is necessary to assure a full understanding of the invention. However, if the reader desires further explanation of such structures, reference may be made to any of the above-mentioned patents or to U.S. Pat. No. 3,182,383, which issued on May 11, 1965 and discloses a coil assembly in which a form wound coil is mounted on a laminated pole structure.

In order to provide a dielectric ground barrier between the pole member 2 and the energizing coil 3, according to the invention, a plurality of formed sheets 4, 5, 6 and 7 of insulating material are mounted on the pole member 2, as shown in FIG. 1. Except for the relative lengths of their respective sides, each of the formed sheets 4–7 may be made substantially identical to one another; thus, only the unique features of formed sheet 4 will be described to afford a complete understanding of the invention. Sheet 4 is provided with a back part having sides 4A and 4B disposed respectively at essentially right angles to one another. Sheet 4 also includes a lip part comprising a first section 4C, a second section 4D and a third section 4X. The third section 4X is bonded to the first and second sections in a manner that will be more fully described below, after the remaining characteristic features of the pole and coil assembly 1 are explained. At this point, though, it should be noted that the third section 4X is characterized by a smooth surface configuration that is conformed closely to the adjacent pole surface. Moreover, the third section 4X is made of a molded, resin-saturated felt to form a void-free dielectric barrier capable of insulating the coil from the pole in the corner areas thereof where high electrical stresses exist after the coil is energized.

When assembled in operating position, as shown in FIG. 1, the extended corner piece comprising insulating sheet 4, and each of the other extended corner sheets 5–7, are mounted with their respective back parts (such as parts 4A, 4B) against the adjacent sides of the pole member 2 so that the back parts of the insulating sheets extend around and a predetermined distance beyond the respective corners of the pole base portion. Also, the lip parts of the respective corner pieces, or insulating sheets, 4-7, are positioned to face the respective upper surfaces of the pole tip portions 2B and 2C, that are juxtaposed with the coil 3, as seen in FIG. 1. This arrangement of the insulating sheets 4-7 positions the ends of each of the sheets in overlapping relationship with the ends of adjacent sheets as can be seen in the drawing. It is preferred that the overlapping relationship in the embodiment of the invention being described is such that at least one quarter inch of the end of the respective sheets overlap one another. Such an overlapping arrangement enables a desirably secure mechanical bond to be formed between the ends of the respective sheets 4-7 when they are adhered together and adhered to the pole 2 with a suitable dielectric, thermosetting resin, according to the method of the invention. Also, this arrangement results in the adjacent sheets 4-7 covering substantially all of the sides and corners of the pole base portion 2A and completely covers the upper surfaces of the pole tip portions 2B and 2C, which are the surfaces of those tips closest to the coil 3 in the final assembled position of that component.

It should be understood that the lip sections 4C, 4D, which are integrally formed with the back parts 4A and 4B, and the felt lip section 4X, which is adhered to the other lip sections, can all be made to extend beyond the adjoining faces of the pole tip portions 2B, 2C and the adjacent bottom surfaces of coil 3, as shown in FIG. 1, if it is desirable to extend the electrical creepage or tracking paths between those components. On the other hand, such an extended width of the lip sections of the insulating corner pieces 4-7, can be diminished, or essentially eliminated, in other applications of the invention, so that the lip sections only project between the pole tips 2B, 2C and the associated coil 3, rather than significantly beyond those components.

In the embodiment of the invention illustrated in FIG. 1, it can be seen that insulating sheet 4 and the other sheets 5-7 have respective sides, e.g., back parts 4A and 4B, that extend beyond an adjacent corner of the pole member 2 by different lengths. The longer side (4B) of sheet 4 is disposed at about 90° to the shorter side (4A) thereby to define a generally L-shaped configuration around the corner of the pole member. Also, in this embodiment of th invention, the back parts (4A, 4B) and lip parts (4C, 4D and 4X) of each of the sheets 4-7 are positioned at about 90° to each other. Moreover, the first lip section 4C is made co-extensive in length with the shorter side 4A of the sheet 4, while the second lip section 4D is co-extensive in length with the longer side 4B of sheet 4. The third lip section 4X is formed to define a corner that extends between the first and second lip sections 4C and 4D, as seen in FIG. 1. Of course, similar lip sections are formed on the other sheets 5-7 but are not specifically illustrated or described in detail here.

Each of the sheets of insulating material 4-7 in this embodiment of the invention is formed of a calendered, commercially available Nomex (tradename of E. I. DuPont Company, Inc. of Wilmington, Delaware) paper and is formed by bending the respective sheets into the configuration shown and cutting the corner areas of their respective lip parts to provide a gap therein that is eventually filled by the third lip section (4X) as shown in FIG. 1. The respective third lip sections (4X, etc.) of the respective lip parts are each formed of a Nomex felt material that is also commercially available, and is impregnated with a suitable dielectric, thermosetting resin that has desirably rapid curing characteristics. Although a number of suitable resins can be used in practicing this portion of the invention, in the preferred embodiment illustrated the impregnating resin is generically described as an electrical grade polyester resin. A commercially available product designation for that resin in G.E. IMPS #3405, which is available from General Electric Company, Schenectady, New York. An important feature of the third lip section 4X, as thus formed according to the invention, is that is conforms smoothly to the surface of the adjacent pole surfaces, thereby eliminating undesirable air gaps between those components of the assembly. Moreover, the section 4X, as it is molded and cured forms a solid dielectric ground barrier that is virtually free of pin-hole voids; thus, the dielectric strength of the extended corner members is excellent in the critical pole corner areas where high electrical stresses exist.

In order to provide a secure gripping surface for the Nomex felt corner lip section 4X, the adjacent ends of the first and second lip sections 4C and 4D are, respectively, provided with roughened areas, such as these illustrated by dotting the areas 4C' and 4D' of FIG. 1. The Nomex felt is pressed into form with the roughened areas 4C' and 4D' before being cured. Of course, in practicing alternative embodiments of the invention various suitable roughening techniques for preparing the ends of the first and second section 4C and 4D of the lip part may be used to provide an improved gripping surface for the cured Nomex felt and saturating resin. Similarly, the bottom area of the back part 4A-4B of the sheet 4, over which the corner section 4X of the Nomex felt extends as described above can be roughened if desired. However, in this embodiment of the invention no such roughening is used in the bottom area of the back part 4A-4B, because it has been found that a suitable bond can be afforded by the use of heat and pressure applied to the saturated felt. If a stronger bond is desired respective surfaces of the lip sections can all be roughened before the felt is adhered to them. In this embodiment a predetermined portion of the ends of the first and second sections 4C and 4D of the lip part and the bottom of the back part 4A-4B are overlapped by the Nomex felt. That portion is equal to about ¼" in depth, i.e., extending in all directions from the gap between the ends of the first lip section 4C and the second lip section 4D. In other embodiments of the invention somewhat greater or lesser overlap with the corner sections (4X) may be successfully utilized. It is important, however, to form a complete and generally uniform extended-corner dielectric layer between the energizing coil 3 and the pole member 2; particularly, at the high electrical stress areas defined by the sharp corners of the pole member. Thus, as can be seen in the preferred embodiment of the invention illustrated in FIG. 1, with the corner section 4X overlapped on the adjacent back part of the insulating sheet 4 by about ¼ of an inch, the Nomex felt section 4X extends at least about ¼ of an inch in all directions from the intersection of the corner defined by the first lip section 4B and the second lip section 4D. The felt section 4X is molded to conform closely to the configuration of the juxtaposed pole base and tip areas so it secures the entire extended corner member in the desired smooth, L-shaped form.

Now that the unique features of the pole and coil assembly of the invention have been described in detail, reference will be made to FIG. 2 of the drawing to explain a preferred sequence of steps to practice the method of the invention. In order to construct a pole and coil assembly by this method, a pole member having a pole base portion and protruding tip portions, such as those shown in the assembly of FIG. 1, is provided. It will be understood that such a pole can have a wide variety of different configurations and dimensions, including the rectangular type of pole base portion shown in FIG. 1, or a pole base portion that is essentially square in cross-section. Next, four sheets of insulating material, such as calendered Nomex paper, are formed, respectively, with back parts and lip parts that are adapted to cover the pole base and tip portions in the manner illustrated in FIG. 1. This forming operation can be accomplished by cutting the sheets of insulating material in predetermined patterns to define corner gaps that will be subsequently covered by Nomex felt sheets (4X), as seen in FIG. 1. Next, the edges of the cut sheets are bent to form them into the generally L-shaped configuration seen in FIG. 1, in which back parts (4A–4B) and the first, second and third sections of each lip part are defined. As noted above in the description of the assembly shown in FIG. 1, in some embodiments the respective ends of the first and second sections of the lip part adjacent to the third lip section are roughened to provide a good gripping surface for the impregnated Nomex felt to be applied thereto. However, in the most preferred method steps, the Nomex felt section 4X is molded to the other lip sections under heat and pressure to bond it thereto without the need for roughening those surfaces.

A predetermined pattern of Nomex felt is cut to extend between the ends of the first and second lip sections 4C and 4D and to overlap those ends by about ¼ of an inch and to extend about ¼ of an inch over the bottom area of the back parts (4A, 4B) of the respective sheets. The impregnated Nomex felt is then molded to define a third lip section that is essentially flat, smooth and conformed in shape to the pole base and tip portions next to it in its assembled position, as seen in FIG. 1. The resin in the felt sections (4X) is then cured to stiffen and hold the extended corner parts in their respective L-shaped configurations. Finally, each of the sheets 4–7 is placed with its ends in overlapping relationship to the ends of adjacent similar sheets and each sheet is adhered to the base portion 2A of the pole 2. When in this mounted position the sheets of insulating material are arranged to cover and bond to the sides of the base portion and the upper surfaces of the pole tip portions 2B and 2C, as generally seen in FIG. 1.

A suitable damming compound is positioned on the upper surface of the respective lip parts, as shown by the layers of compound 10A and 10B in FIG. 1. Various damming compounds may be used but in the preferred embodiment of the invention a silica-filled BF$_3$MEA catalyzed cycloaliphatic epoxy high viscosity thixotropic damming compound is employed. A pre-formed energizing coil, such as the coil 3 shown in FIG. 1, is then mounted around the pole 2, over the sheets of insulating material 4–7 and is pressed against the damming compound 10A and 10B to compress it toward the upper surfaces of the pole tip portion 2B and 2C.

With the coil thus mounted on the pole, a major part of the space between the coil 3 and the insulating sheets 4–7 is then filled with a suitable casting material 11 to thereby improve thermal conduction between the coil and pole. While a number of casting compounds may be used for this purpose, in the preferred embodiment of the invention the casting material employed is a silica-filled dicyandiamide catalyzed bis-A epoxy. This is a relatively low viscosity casting compound and is functionally equivalent to a casting compound available commercially under the tradename Amicon 925-12, which is available from Amicon Corporation.

Now that the structural features of the preferred embodiment of a pole and coil assembly of the invention have been described along with an explanation of a preferred method for building such an assembly, the operation of the invention will be clear to those skilled in the art. Of course, various alterations in, and modifications of, the preferred embodiments described can be made without departing from the invention. Accordingly, it is our intention to encompass within the scope of the following claims the true spirit and scope of the invention.

What we claim as new and desire to secure by Letters Patent of the United States is:

1. A method of making an insulated pole and coil assembly comprising the steps of:

(a) providing a pole having a base portion with tip portions protruding from generally opposite sides thereof, (b) forming sheets of readily bendable insulating material with back parts and lip parts that are adapted, respectively, to cover the corners and the sides of the pole base and surfaces of the tip portions, said forming including the steps of b-1, b-2 and b-3 as set forth below, (b-1) cutting sheets of calendered insulating material into predetermined pole-covering patterns, (b-2) bending edges of the calendered sheets to form them into L-shaped back parts and first and second sections of a lip part that define a gap at the corner thereof, (b-3) adhering a preformed sheet of insulating felt to the ends of the first and second sections of each lip part adjacent to said corner gap and to the back part adjacent said corner, thereby to cover the gap and form said sheet of insulating felt as a third section of each lip part, (c) mounting the sheets of insulating material on the pole to cover each corner thereof and extend beyond said corners, respectively, to cover the sides of the pole base portion and one surface of the tip portions, (d) mounting a coil around the pole over the sheets of insulating material to press them against the tip portions of the pole.

2. A method as defined in claim 1 including the step of:

(b-2-1) roughening the ends of said first and second sections of the lip part adjacent the gap therein to form a gripping surface for said third lip section.

3. A method as defined in claim 1 including the step of:

(e) filling a major part of the space between the coil and sheets of insulating paper with a cast dielectric material to improve thermal conduction and electrical insulation between the coil and pole.

4. A method as defined in claim 1 the b-3 step including the steps of:

(b-3-1) impregnating each preformed sheet of insulating felt with thermosetting resin, (b-3-2) molding each of said sheets of impregnated felt to conform smoothly to the surfaces of the pole adjacent the respective areas thereof to be covered by said sheets of felt, (b-3-3) curing the thermosetting resin impregnated in each of said felt sheets thereby to bond the felt sheets to said formed sheets of insulating material.

* * * * *